United States Patent [19]

Beyts et al.

[11] Patent Number: 5,380,541
[45] Date of Patent: Jan. 10, 1995

[54] SUCRALOSE COMPOSITIONS

[75] Inventors: Pamela K. Beyts, Reading, Great Britain; Donald W. Lillard, Decatur, Ill.; Cynthia K. Batterman, Tannersville, Pa.

[73] Assignees: Tate & Lyle Public Limited Company, Great Britain; A.E. Staley Manufacturing Company, Decatur, Ill.

[21] Appl. No.: 871,482

[22] Filed: Apr. 21, 1992

Related U.S. Application Data

[63] Continuation-in-part of Ser. No. 597,109, Oct. 17, 1990, abandoned, which is a continuation-in-part of Ser. No. 378,130, Jul. 11, 1989, abandoned, which is a continuation-in-part of Ser. No. 83,554, Aug. 7, 1987, abandoned, which is a continuation-in-part of Ser. No. 254,425, Oct. 6, 1988, abandoned.

[30] Foreign Application Priority Data

Oct. 6, 1987 [GB] United Kingdom ............... 8723423
Mar. 28, 1989 [GB] United Kingdom ............... 8907007
Aug. 3, 1989 [CA] Canada .............................. 573653

[51] Int. Cl.$^6$ ............................................. A23L 1/236
[52] U.S. Cl. ................................. 426/548; 426/658; 426/804; 426/590
[58] Field of Search ................ 426/548, 590, 658, 804

[56] References Cited

U.S. PATENT DOCUMENTS

| | | | |
|---|---|---|---|
| 3,325,296 | 6/1967 | Braaten | 426/548 |
| 4,863,752 | 9/1989 | Beyts | 426/548 |
| 4,915,969 | 4/1990 | Beyts | 426/548 |
| 4,927,646 | 5/1990 | Jenner | 426/548 |

*Primary Examiner*—Carolyn Paden
*Attorney, Agent, or Firm*—Ostrolenk, Faber, Gerb & Soffen

[57] ABSTRACT

Synergy is is obtained by combining sucralose and a sweet saccharide selected from fructose; glucose; maltose and other glucooligosaccharides; fructose mixed with glucose and/or gluco-oligosaccharides; lactose; isomaltulose; and sugar alcohols.

20 Claims, No Drawings

SUCRALOSE COMPOSITIONS

This application is a continuation-in-part of application Ser. No. 597,109 filed Oct. 17, 1990, now abandoned, which was a continuation-in-part of application Ser. No. 07/378,130 filed Jul. 11, 1989, now abandoned, which was a continuation-in-part of application Ser. No. 07/083,554, filed Aug. 7, 1987, now abandoned and application Ser. No. 07/254,425, filed Oct. 6, 1988, now abandoned.

BACKGROUND OF THE INVENTION

This invention relates to compositions of the high intensity sweetener sucralose with sweet saccharides, the compositions exhibiting synergy.

In this specification and in the claims, the term "ingestible composition" is used to mean a composition which is intended to be taken into the mouth and swallowed, substantially in its entirety. Examples include foodstuffs, beverages, medicaments and confectionery as well as dry mixes and concentrates for use in the preparation of such compositions. The term hence specifically excludes chewing gum, which is partially ingested and partially ejected. The term "oral product" is used to mean a substance which is intended to be taken into the mouth but not swallowed. Examples include toothpastes, mouthwashes and other buccal and dental preparations. Again, the term specifically excludes chewing gum.

U.S. Pat. No. 4,986,991, assigned to Wm. Wrigley Jr. & Company, discloses and claims chewing gum formulations containing sucralose and other sweeteners, in particular sorbitol, mannitol and xylitol, which have a particular extended sweetness and flavour release profile. The requirement for such a profile is important in chewing gum formulation, where flavourings and sweetness must be distributed such that prolonged chewing gradually releases them. However a release profile of this type is of no interest in any other products which are orally consumed and would have no relevance to the formulation of such other products. A chewing gum formulation containing sucralose and glucose syrup is disclosed in U.S. Pat. No. 4,389,394, but no synergy has been reported, the glucose syrup being present solely as a bulking sweetener.

Sucralose, 4,1',6'-trichloro-4,1',6'-trideoxygalactosucrose, is a high intensity sweetener disclosed in British Patent No. 1543167. Sucralose is known to provide marked synergy to compositions also containing certain other high intensity sweeteners having an accompanying bitter taste, in particular saccharin, acesulfame-K and stevioside (GB 2 098 848 B; U.S. Pat. No. 4,495,170) and to compositions containing cyclamate (GB 2 154 850 B). No significant synergy is found in compositions containing sucralose and aspartame, although the quality of sweetness is improved (GB 2 153 combinations of sucralose and sucrose.

SUMMARY OF THE INVENTION

From these findings, it might be concluded that synergy between sucralose and other sweeteners is rather specific. However, we have now found that sucralose also exhibits synergy with certain saccharides, in some cases to a considerable degree.

The saccharides in question are fructose; glucose; maltose and other glucooligosaccharides; fructose mixed with glucose and/or with gluco-oligosaccharides, such as invert sugar and high fructose corn syrups; lactose; isomaltulose; and sugar alcohols, especially monosaccharide sugar alcohols such as xylitol, sorbitol, and mannitol, but also disaccharide sugar alcohols such as isomaltitol, maltitol and lactitol.

The scale of synergy is surprisingly high considering that with sucrose there is no significant synergy at all. Thus, pure fructose can be potentiated with a synergy (i.e. increased sweetening power) of about 33%. With invert sugar (i.e. glucose+fructose, 1:1) the synergy is about 21%, while with high fructose corn syrup (42% fructose, dry solids basis), the synergy is about 12%.

According to the present invention there is provided a sweetening composition for sweetening ingestible compositions and oral products, the composition consisting essentially of sucralose; a sweet saccharide selected from fructose; glucose; maltose and other glucooligosaccharides; glucose mixed with maltose and other oligosaccharides; fructose mixed with glucose and/or gluco-oligosaccharides, lactose, isomaltulose, and sugar alcohols, and, optionally, a carrier for a sweetening composition; the relative sweetness contribution provided by the sucralose and the sweet saccharide being from 5:1 to 1:5. By the term "sweetening composition", we mean a composition for use in sweetening foodstuffs, beverages etc, e.g. sweetening tablets and granules, concentrates for the beverage industry etc.

According to a further feature of the present invention there is provided a method of sweetening an ingestible composition or oral product (as defined above) comprising incorporating therein sucralose and a sweet saccharide selected from fructose; glucose; maltose and other glucooligosaccharides; glucose mixed with maltose and other oligosaccharides; fructose mixed with glucose and/or gluco- oligosaccharides; lactose; isomaltulose; and sugar alcohols; such that the relative sweetness contribution provided by the sucralose and the sweet saccharide is from 5:1 to 1:5, and preferably from 3:1 to 1:3, most preferably about 1:1. The term 'oligosaccharide' is used in the conventional sense of 2-10 saccharide units.

According to a further feature of this invention there is provided an ingestible composition or oral product (as defined above) sweetened with a sweetening composition as defined above or by a method as defined above. Examples of such compositions include, in particular, soft drinks (cola, carbonated fruit drinks etc), confectionery, baked goods and dietetic foods (containing sorbitol).

The synergy levels quoted above are the increased sweetening power per unit weight obtained for the composition as a percentage of the expected degree of sweetening power (i.e. the sum of the sweetening power theoretically provided by each of the sweeteners). An alternative and more useful measure of synergy is the percentage saving, that is to say the difference between the amount actually needed to obtain a certain degree of sweetness and the theoretical amount needed expressed as a percentage of the theoretical amount needed. On this basis the saving with fructose is about 25% and with invert sugar is about 18%.

The synergy of sucralose with fructose and with fructose-glucose mixtures is particularly useful in the formulation of soft drinks where fructose is a highly desirable sweetener on account of its flavour and mouthfeel properties. Combinations with sucralose enable the calorie level to be markedly reduced and the synergy enables the amount of fructose and sucralose to be reduced below the expected levels.

In general, the synergy between sucralose and the saccharide or saccharide mixture will extend over a range of sucralose to saccharides providing a relative sweetness contribution of 5:1 to 1:5. In plain water this sweetness contribution range relates for fructose to a weight ratio of 1:115 to 1:2880. However, in foods and beverages other components influence the expression of sweetness, particularly in the case of sucralose itself. Thus, for example, although in water a solution of 0.00842% sucralose is equisweet with 5% sucrose, in a typical cola formulation a concentration of 0.012% sucralose is required for the same degree of sweetness. This means that the weight ratio for a 50:50 sweetness contribution for the two sweeteners will vary from the value in water, depending on the nature of the foodstuff or beverage. Typical ratios are as follows:

| (50/50 sweetness) | Ratio by weight | | | |
|---|---|---|---|---|
| | water 5% sucrose equiv. | cola or lemonade 10% sucrose equiv. | instant lemon tea 3.5% sucrose equiv. | strawberry milk drink 2.5% sucrose equiv. |
| (a) | 1:576 | 1:390 | 1:384 | 1:439 |
| (b) | 1:693 | — | — | — |

(a) = sucralose:fructose
(b) = sucralose:fructose + dextrose monohydrate

The following examples illustrate the invention:

DESCRIPTION OF THE PREFERRED EMBODIMENTS

EXAMPLE 1

Measurement of synergy

Synergy was measured by determining the concentration of each sweetener or sweetener combination having the same degree of sweetness as sucrose at a given concentration i.e. the equisweet point.

The materials used were as follows:

| | |
|---|---|
| Sucrose (granulated sugar) | Tate & Lyle Sugars |
| Fructose (Fructofinn, TM) | Finn Sugar Co. |
| High Fructose Corn Syrup (HFCS), Isosweet 351 | Tunnel Refinery |
| Artificial Invert sugar | Fructofinn/D-glucose (Fisons A.R.) 50/50 w/w |
| Sucralose | Tate & Lyle Speciality Sweeteners, |
| Glucose (dextrose monohydrate) | Koch-Light Ltd |
| Glucose syrup (42 DE acid-converted glucose syrup) Globe (TM) 01132 (19% dextrose, 15% maltose, 66% oligosaccharides dsb) | C.P.C. Inc. |
| Xylitol | F. R. Benson and Partners |
| Mannitol | Zimmerman Hobbs |
| Sorbitol | Chemical Exchange |
| Lactose "extra selected" | Philpot Dairies |
| Maltose | F. R. Benson & Partners |
| Isomaltitol (Palatinit, TM) | Palatinit Sussungsmittel GmbH |
| Maltitol | F. R. Benson & Partners |
| Isomaltulose (Palatinose, TM) | Mitsui, Japan |
| Lactitol | Philpot Dairies |

All sweeteners were prepared as solutions in tap water (pH 8±1) and served at a temperature of approximately 20° C. All concentrations are expressed as % (w/v).

The standard was a 5% solution of sucrose (Tate & Lyle granulated sugar in Reading tap water, pH about 8.0). The concentrations of sucralose, fructose, invert sugar, glucose, glucose syrup, high fructose corn syrup, xylitol, mannitol, lactose, maltose, isomaltitol, maltitol, isomaltulose, lactitol, sorbitol and sucrose which were equisweet to the standard sucrose solution were measured by taste panels using the constant stimulus paired comparison method (Amerine, Pangborn & Roessler, "Principles of Sensory Evaluation of Food", Academic Press New York).

A series of five or more concentrations of increasing intensity were prepared for each sweetener so that the mid-concentration was approximately the same sweetness as the sucrose control. Coded samples were presented in pairs to panellists, one of the pair being one of the test solutions and the other the sucrose control. Order of presentation of the pairs was randomised and within each pair half the panellists received the standard sucrose first, half the test solution first. Panellists were asked to choose the sweeter sample. "No difference" replies were allocated half to the sucrose control, half to the test sample.

Between sample pairs a one minute rest period was enforced. Panellists were instructed to rinse with water between pairs. The % panellists choosing the test sweetener level as sweeter than the sucrose standard was plotted against the % sweetener concentration. The results were subjected to probit analysis and for each solution the test concentration was calculated at which 50% of the responses would indicate the test sweetener to be sweeter than the sucrose standard: this is taken as the equisweet point or sucrose equivalent value (SEV).

The results were as follows:

| | |
|---|---|
| Sucralose | 0.00842% |
| Fructose | 4.85% |
| Artificial Invert Sugar | 5.84% |
| High Fructose Corn Syrup (HFCS) | 8.87% |
| Maltose | 13.05% |
| Xylitol | 5.69% |
| Mannitol | 9.66% |
| Sorbitol | 9.5% |
| Isomaltitol | 15.2% |
| Maltitol | 7.89% |
| Lactose | 16.2% |
| Lactitol | 16.4% |
| Isomaltulose | 13.3% |
| Glucose Syrup | 25.26% |
| Glucose (dextrose monohydrate) | 9.67% |

To determine the synergy of combinations of sucralose and the other sweeteners, compositions were mixed which contained a theoretical 5% SEV (based on the SEVs listed above) with an equal sweetness contribution from each sweetener. Thus, since the 5% SEV for sucralose was 0.00842% and the 5% SEV for fructose was 4.85%, a theoretical 50:50 sweetness contribution mixture with a 5% SEV would contain 0.00421% sucralose and 2.425% fructose, i.e. a weight ratio of 1 to 576. This mixture was then dissolved at various concentrations and tested in the same way as described above to obtain a 5% SEV for each mixture.

The percentage saving over the theoretical amount required can then be calculated as $$\frac{A - B}{A} \times 100$$

or alternatively the percentage increase in sweetening power can be calculated $$\frac{A - B}{B} \times 100$$

where A is the concentration of one component in the blend required theoretically and B is the concentration of that component of the blend found experimentally to be necessary.

On this basis the following values were obtained for 50/50 sweetness contributions from:

1. Sucralose/fructose
   SEV=0.00316% sucralose+1.818% fructose
   saving=25%
2. Sucralose/sucrose
   SEV=0.00415% sucralose+2.467% sucrose
   saving=1.33%
3. Sucralose/invert sugar
   SEV=0.00347% sucralose+2.406% invert sugar
   saving=17.6%.
4. Sucralose/HFCS
   SEV=0.00375% sucralose+3.95% HFCS
   saving=10.7%
5. Sucralose/xylitol
   SEV=0.0038% sucralose+2.57% xylitol
   saving=9.7%
6. Sucralose/mannitol
   SEV=0.00381% sucralose+4.37% mannitol
   saving=9.5%
7. Sucralose/sorbitol
   SEV=0.00367% sucralose+4.14% sorbitol
   saving=12.8%
8. Sucralose/isomaltitol
   SEV=0.00353% sucralose+6.38% isomaltitol
   saving=16.2%
9. Sucralose/maltitol
   SEV=0.00409% sucralose+3.84% maltitol
   saving=2.7%
10. Sucralose/lactose
    SEV=0.00348% sucralose+6.69% lactose
    saving=17.3%
11. Sucralose/maltose
    SEV=0.00379% sucralose+5.87% maltose
    saving=10.0%
12. Sucralose/lactitol
    SEV=0.0036% sucralose+7.02% lactitol
    saving=14.5%
13. Sucralose/isomaltulose
    SEV=0.00372% sucralose+5.88% isomaltulose
    saving=11.6%
14. Sucralose/dextrose monohydrate (DMH)
    SEV=0.00364% sucralose+4.18% DMH
    saving=13.5%
15. Sucralose/glucose syrup
    SEV=0.00328% sucralose+9.84% glucose syrup
    saving=22%

| Summary of Results | | |
|---|---|---|
| Sweetening Composition (weight ratio) | % Saving | % Increase in Sweetening Power |
| Sucralose/fructose (1:576) | 25 | 33 |
| Sucralose/dmh (1:1148) | 14 | 16 |
| Sucralose/invert (1:693) | 18 | 21 |
| Sucralose/HFCS (1:1053) | 11 | 12 |
| Sucralose/glucose syrup (1:3000) | 22 | 28 |
| Sucralose/sucrose (1:594) | 1 | 1 |
| Sucralose/xylitol (1:671) | 10 | 11 |
| Sucralose/mannitol (1:1147) | 10 | 11 |
| Sucralose/sorbitol (1:1128) | 13 | 15 |
| Sucralose/isomaltitol (1:1807) | 16 | 19 |
| Sucralose/maltitol (1:939) | 3 | 3 |
| Sucralose/lactose (1:1922) | 17 | 21 |
| Sucralose/maltose (1:1549) | 10 | 11 |
| Sucralose/lactitol (1:1950) | 14 | 17 |
| Sucralose/isomaltulose (1:1581) | 12 | 13 |

EXAMPLE 2

Measurement of synergy in a model soft drink formulation sweetened to the equivalent of 9.5% sucrose Equisweet concentrations (g sweetener/100 ml) to a standard 10% invert sugar solution (sweetness equivalent to 9.5% sucrose) in 0.12% hydrated citric acid solution (pH 3.0) were measured as described in Example 1.

For these tests the carbohydrates sweetener concentration was fixed at 4.5% solids and the concentration of sucralose required to give total sweetness equivalent to the standard was determined experimentally for each combination.

Synergy between the sweeteners was measured as follows:

Synergy between sweeteners is quantified in the following way for two sweeteners A and B which are used in a blend:

| | g/100 mls |
|---|---|
| Concentration of sweetener A (used alone) required to provide sweetness of standard | a |
| Concentration of sweetener B (used alone) to provide sweetness of standard | b |
| Concentration of sweeteners used in the blend to provide sweetness of standard | a' + b' |
| Sweetness contribution in blend from sweetener A | $\frac{a'}{a} \times 100 = A'\%$ |
| Sweetness contribution in blend from sweetener B | $\frac{b'}{b} \times 100 = B'\%$ |

% saving (Synergy) = 100 − (A' + B')

| Materials | |
|---|---|
| Sweetener | Supplier |
| Fructose | Geest (Fructofinn) |
| Glucose, DMH | Tunnel |
| Isosweet 45% HFCS | Tunnel |
| Flosweet Glucose Syrup | CPC |
| Globe Glucose Syrup | CPC |
| Invert Syrup N2104 | Tunnel |

| *A | B | C | D | E | F | G | H |
|---|---|---|---|---|---|---|---|
| Sucrose | 9.54 | 47.17 | 0.0202 | 0.01024 | 50.69 | 2 | 48:52 |
| Fructose | 7.73 | 58.21 | 0.0202 | 0.00470 | 23.27 | 19 | 71:29 |
| Glucose | 15.86 | 28.37 | 0.0202 | 0.01258 | 62.28 | 9 | 31:68 |
| HFCS | 10.83 | 41.55 | 0.0202 | 0.00721 | 35.69 | 23 | 54:46 |
| Invert Syrup | 10.09 | 44.60 | 0.0202 | 0.0073 | 36.14 | 19 | 55:45 |
| Flosweet | 35.40 | 12.71 | 0.0202 | 0.0123 | 60.89 | 26 | 17:83 |

-continued

| | | | | | | | |
|---|---|---|---|---|---|---|---|
| Globe | 28.78 | 15.64 | 0.0202 | 0.0155 | 76.63 | 8 | 17:83 |

*Footnote:
A = Sweet Saccharide
B = Concentration Sweet Saccharide (solids) when no Sucralose present g/100 mls
C = Sweetness from 4.5% Sweet Saccharide when used with Sucralose %
D = Concentration Sucralose with no Sweet Saccharide g/100 mls
E = Concentration Sucralose with 4.5% Sweet Saccharide g/100 mls
F = Sweetness from Sucralose when used with Sweet Saccharide
G = Sweetness Saving (Synergy) %
H = Approximate Sweetness Contribution Sweet Saccharide:Sucralose

EXAMPLE 3

Cola Sweetened to equivalent of 10% sucrose

| | |
|---|---|
| Sodium benzoate solution (10% w/v) | 0.154% |
| Phosphoric acid (88%) | 0.015% |
| Cola base 17.40. 1114* | 0.449% |
| Cola Flavour 15.01.6930* | 0.016% |
| Sucralose | 0.009% |
| Fructose | 3.510% |
| Carbonated water | 95.847% |

*IFF (Great Britain) Ltd

EXAMPLE 4

Carbonated Lemonade sweetened to equivalent of 10% sucrose

| | |
|---|---|
| Sodium benzoate solution (10% w/v) | 0.192% |
| Anhydrous citric acid | 0.240% |
| Lemon flavour DA 05856* | 0.096% |
| Sucralose | 0.009% |
| Fructose | 3.510% |
| Carbonated water | 95.953% |

*Naarden International

EXAMPLE 5

Instant Lemon Tea sweetened to equivalent of 3.5% sucrose

| | |
|---|---|
| Maltodextrin 20 DE | 22.13% |
| Cold soluble instant tea-932* | 9.48% |
| Malic Acid | 6.02% |
| Flavour-Lemon 9/790918** | 0.79% |
| Sucralose | 0.16% |
| Fructose | 61.42% |

*Batchelor's Catering Services
**Dragoco Ltd

Mix and pack in 20 g sachet. Dissolve sachet in 1 liter water.

EXAMPLE 6

Ready to drink strawberry flavoured milk sweetened to equivalent of 2.5% sucrose

| Ready to Drink Strawberry Milk | |
|---|---|
| Skimmed milk | 98.818% |
| Emulsifier-Recodan CM* | .200% |
| Colour-Ponceau 4R (E124) | .002% |
| Flavour-Strawberry E4468L** | .100% |
| Sucralose | .002% |
| Fructose | .878% |
| (each of sucralose and fructose contributes 1.25% sucrose equivalent). | |

*Grinstead Products Ltd
**Fries and Fries Ltd

EXAMPLE 7

Sweetener Composition

A sweetening composition is prepared by mixing 1.26 g sucralose and 727 g fructose. The resulting mixture has a sweetening power equivalent to that of 2 kg sucrose. This degree of sweetness (provided in a 50:50 share by the two components) would theoretically be provided by 1.68 g sucralose plus 970 g fructose, a saving of 25%.

EXAMPLE 8

Lemonade sweetened to the equivalent of 9.5% sucrose

| | Fructose % | HFCS | Invert Syrup | Globe Syrup |
|---|---|---|---|---|
| Sodium benzoate solution (10% w.v) | 0.192 | 0.192 | 0.192 | 0.192 |
| Anhydrous citric acid | 0.240 | 0.240 | 0.240 | 0.240 |
| Lemon flavour DA 05856* | 0.096 | 0.096 | 0.096 | 0.096 |
| Sucralose | 0.0047 | 0.0072 | 0.0073 | 0.0155 |
| Fructose | 4.5 | — | — | — |
| HFCS | — | 6.3** | — | — |
| Invert (glucose/fructose) | — | — | 4.5 | — |
| Globe Syrup | — | — | — | 5.6** |
| Carbonated water | 94.9673 | 93.1648 | 94.9647 | 93.8565 |
| Synergy as saving: | 19% | 23% | 19% | 8% |

*Naarden International
**providing 4.5% solids

EXAMPLE 9

Peppermint tablet

| | Sorbitol % w/w | Mannitol % w/w | Xylitol % w/w |
|---|---|---|---|
| Sucralose | 0.01 | 0.01 | 0.005 |
| Sorbitol[1] | 98.19 | — | — |
| Mannitol[1] | — | 98.19 | — |
| Xylitol[1] | — | — | 98.195 |
| Magnesium Stearate[2] | 1.00 | 1.00 | 1.00 |
| Peppermint Durarome[3] sugar free 386292 | 0.80 | 0.80 | 0.80 |

1. Roquette (UK) Ltd
2. Croxton & Garry Ltd, U.K.
3. Semmons Taylor Ingredients, U.K.

EXAMPLE 10

Cherry dry mix beverage

Each portion (sachet) contains enough to make 100 ml drink

| All amounts in grams | Fructose | Sorbitol | DMH |
|---|---|---|---|
| Anydrous citric acid | 0.18 | 0.18 | 0.18 |
| Maltodextrin (20 DE) | 0.11 | 0.11 | 0.11 |
| CMC P20P | 0.033 | 0.033 | 0.033 |
| Cherry Flavour E34955D | 0.02698 | 0.02698 | 0.02698 |
| FD & C Red No. 4 (colouring) | 0.0062 | 0.0062 | 0.0062 |
| Sucralose | 0.0045 | 0.0052 | 0.0050 |
| Fructose | 3.0 | — | — |
| Sorbitol | — | 6.96 | — |
| Dextrose monohydrate (DMH) | — | — | 6.88 |
| Synergy as saving | 25% | 13% | 14% |

EXAMPLE 11

Sweetener compositions comprising sucralose and isomaltitol or sucralose and isomaltulose Sweetener compositions prepared by (a) mixing 2550 g isomaltitol with 1.41 g sucralose. The resulting composition has a sweetening power equivalent to that of 2 kg of sucrose. The synergy between isomaltitol and sucralose results in a saving of 16% (theoretical amounts of each component if no synergy existed are 3040 g isomaltitol and 1.68 g sucralose, each providing the equivalent of 1 kg sucrose).

(b) mixing 2350 g isomaltulose with 1.49 g sucralose. The resulting composition has a sweetening power equivalent to that of 2 kg of sucrose. The synergy between isomaltulose and sucralose results in a saving of 11.6% (theoretical amounts of each component if no synergy existed are 2600 g isomaltulose and 1.68 g sucralose, each providing the equivalent of 1 kg sucrose).

(c) mixing 1998 g isomaltulose with 1.76 g sucralose. The resulting composition has a sweetening power equivalent to that of 2 kg of sucrose; i.e. they both provide about the same amount of sweetness per unit weight. The synergy between isomaltulose and sucralose results in a saving of about 10% (theoretical amounts of each component if no synergy existed are 2220 g isomaltulose and 1.96 g sucralose; isomaltulose providing about 40% and sucralose about 60% of the sweetness).

EXAMPLE 12

Carbonated lemonade sweetened to the equivalent of 10% sucrose

| Sodium benzoate solution (10% w/v) | 0.192% |
|---|---|
| Anhydrous citric acid | 0.240% |
| Lemon flavour DA 05856* | 0.096% |
| Sucralose | 0.012% |
| Isomaltulose | 4.500% |
| Carbonated water | 94.960% |

*Naarden International
Sweetness contribution ratio of sucralose:isomaltulose = 4:1

EXAMPLE 13

Ready to drink strawberry-flavoured milk sweetened to the equivalent of 2.5% sucrose

| Skimmed milk | 96.756% |
|---|---|
| Emulsifier, Recodan CM* | 0.200% |
| Colour, Ponceau 4R (E124) | 0.002% |
| Flavour, Strawberry E4468L** | 0.100% |
| Sucralose | 0.002% |
| Isomaltulose | 2.940% |

*Grinstead Products Limited
**Fries & Fries Limited
Sweetness contribution ratio of sucralose:isomaltulose = 1:1

EXAMPLE 14

Sponge Cake

| Ingredients | |
|---|---|
| Margarine | 227 g |
| Product of Example 11(c) | 227 g |
| 4 Eggs | 230 g |
| Self raising flour | 227 g |

The margarine and sugar (product of Example 11(C)) were creamed together and the eggs were beaten in, then the flour was folded in and the mixture was baked for 25 minutes at 180°-190° C.

EXAMPLE 15

Merinques

| Ingredients | |
|---|---|
| Egg whites (fresh) | 30 g |
| Product of Example 11(c) | 70 g |

The egg white was whipped then the product of Example 11(c) was folded in. The mixture was piped onto baking trays in 3 cm diameter portions and cooked at 65° C. for 90 minutes.

EXAMPLE 16

Filling for bakery products

| Ingredients (parts per 100) | |
|---|---|
| Fat (with emulsifier) | 34.6 |
| Water | 10.0 |
| Isomaltulose | 52.2 |
| Sucralose | 0.008 |
| Milk powder | 2.89 |
| Salt | 0.302 |

Sweetness contribution ratio of sucralose:isomaltulose = 1:4

The ingredients were mixed together for 4 minutes, using an electric mixer.

We claim:

1. A sweetening composition for sweetening ingestible compositions and oral products, the composition consisting essentially of a synergistic mixture of sucralose and a sweet saccharide selected from the group consisting of fructose, glucose, maltose, glucose mixed with maltose and other glucooligosaccharides, fructose mixed with glucose or glucooligosaccharides or both, lactose, isomaltulose, and sugar alcohols; the relative quantities of the sucralose and the sweet saccharide being such as to provide a relative sweetness contribution of from 5:1 to 1:5.

2. A sweetening composition according to claim 1, in which the said relative sweetness contribution is from 3:1 to 1:3.

3. A sweetening composition according to claim 2, in which the said relative sweetness contribution is about 1:1.

4. A sweetening composition according to claim 1, in which the sweet saccharide is selected from the group consisting of fructose, invert sugar, high fructose corn syrup, glucose syrup, isomaltulose, xylitol, mannitol, sorbitol, lactitol, maltitol and isomaltitol.

5. An ingestible composition sweetened with a sweetening composition according to claim 1.

6. An ingestible composition according to claim 5 in the form of a beverage.

7. An oral product sweetened with a sweetening composition according to claim 1.

8. A method of sweetening ingestible compositions and oral products comprising incorporating therein a combination of sweeteners consisting essentially of a synergistic mixture of sucralose and a sweet saccharide selected from the group consisting of fructose, glucose, maltose, glucose mixed with maltose and other glucooligosaccharides, fructose mixed with glucose or glucooligosaccharides or both, lactose, isomaltulose, and sugar alcohols, such that the relative quantities of the sucralose and the sweet saccharide is such as to provide a sweetness contribution of from 5:1 to 1:5.

9. A method according to claim 8, in which the said relative sweetness contribution is from 3:1 to 1:3.

10. A method according to claim 9, in which the said relative sweetness contribution is about 1:1.

11. A method according to claim 8 wherein the oral composition is a beverage.

12. A method according to claim 8 wherein the saccharide comprises fructose.

13. A method according to claim 8 wherein the saccharide comprises invert sugar, isomaltulose, glucose syrup or high fructose corn syrup.

14. A method according to claim 5 wherein the saccharide comprises xylitol, mannitol, sorbitol, lactitol, maltitol or isomaltitol.

15. An ingestible composition sweetened by a method according to claim 8.

16. An ingestible composition according to claim 15 in the form of a beverage.

17. An oral product sweetened by a method according to claim 8.

18. An oral product selected from the group consisting of mouthwash and toothpaste sweetened by a method according to claim 8.

19. An ingestible composition selected from the group consisting of foodstuff, medicament, flavoured confectionery tablet and beverage, sweetened by a method according to claim 8.

20. A sweetening composition for sweetening ingestible compositions and oral products, the composition consisting essentially of a carrier and a synergistic mixture of sucralose and a sweet saccharide selected from the group consisting of fructose, glucose, maltose, glucose mixed with maltose and other glucooligosaccharides, fructose mixed with glucose or glucooligosaccharides or both, lactose, isomaltulose, and sugar alcohols; the relative quantities of the sucralose and the sweet saccharide being such as to provide a relative sweetness contribution of from 5:1 to 1:5.

* * * * *